United States Patent [19]

Hurvitz

[11] Patent Number: 4,786,926
[45] Date of Patent: Nov. 22, 1988

[54] CAMERA ATTACHMENT FOR ENABLING PHOTOGRAPHING OF TRANSPARENCIES IN A SLIDE PROJECTOR

[76] Inventor: James S. Hurvitz, 2351 Physicians Dr., Suite 3-I, Baton Rouge, La. 70808

[21] Appl. No.: 909,123

[22] Filed: Sep. 18, 1986

Related U.S. Application Data

[63] Continuation of Ser. No. 725,589, Apr. 22, 1985, abandoned.

[51] Int. Cl.⁴ ............................................. G03B 29/00
[52] U.S. Cl. ......................................... 354/77; 355/21; 355/39; 355/40
[58] Field of Search ...................... 355/39, 40, 41, 21; 354/77

[56] References Cited

U.S. PATENT DOCUMENTS 1,510,155  9/1924  Nelson .................................. 355/40
2,574,072  11/1951 Updegraff ............................ 355/21
3,689,148  9/1972  Black .................................... 355/39
4,350,419  9/1982  Bowen .................................. 355/39

FOREIGN PATENT DOCUMENTS 1348620  12/1962  France .................................. 355/39

Primary Examiner—Monroe H. Hayes
Attorney, Agent, or Firm—Thorpe, North & Western

[57] ABSTRACT

A camera attachment for photographing color transparencies in a slide projector. The attachment includes an elongated tubular connector, one end of which is threaded to be attached in the lens mounting opening of a single lens reflex camera, and the other end is adapted to be received within the lens assembly receptacle of a slide projector, a lens assembly located in the connector intermediate the ends for focusing an image from a slide in the projector onto the film plane of the camera, a neutral density filter in the connector spaced from the lens assembly and a light diffusing screen to be placed in the projector between the slide and the light source.

3 Claims, 1 Drawing Sheet

CAMERA ATTACHMENT FOR ENABLING PHOTOGRAPHING OF TRANSPARENCIES IN A SLIDE PROJECTOR

This is a continuation of application Ser. No. 725,589 filed Apr. 22, 1985, now abandoned.

BACKGROUND OF THE INVENTION

The present invention relates to a camera attachment for photographing color transparencies in a slide projector.

Color transparencies or slides are widely used and various devices such as viewers, projectors, etc. are commonly employed for displaying them. In the use of such transparencies the desirability of making copies is frequently encountered. To accommodate this need several special purpose accessories or attachments have been developed. These attachments permit transparencies to be photographed either onto conventional film which can be developed to form duplicate slides or onto self developing film to produce immediate prints of the slides. U.S. Pat. No. 3,689,148—Black is typical of the former type accessory and is adapted to be attached to a conventional camera. The Black device includes a slide holder and light source for projecting the image on the slide through a lens system into the interior of the camera. U.S. Pat. Nos. 3,697,175—Sullivan and 4,353,640—Wyller are examples of the latter type accessories. The Sullivan patent shows a slide holder, an electronic flash unit and a light reflecting chamber for back lighting the slide and projecting the image thereon through a lens into the lens of the camera. The Wyller patent discloses a housing which includes a screen and film pack in the film plane, a shutter assembly and a light-tight connector for attaching the housing to the lens assembly of a conventional slide projector. The image on the slide is projected through the lens assembly into the housing and onto the film pack.

The prior art devices are expensive and complex in that they provide special purpose attachments which duplicate the function of cameras and/or projectors already available. Either a special purpose accessory is provided to record an image from a conventional slide projector or another special purpose accessory is provided to project an image from a slide into a conventional camera.

SUMMARY OF THE INVENTION

It is an object of the present invention to provide an attachment for a single lens reflex camera (camera body and macro lens) to photograph transparencies in a slide projector.

It is a further object to provide an attachment for connecting a single lens reflex camera (camera body) to a slide projector to photograph transparencies in the projector.

These and other objects are realized in the present invention by providing an elongated tubular connector, one end of which is adapted to be attached to the lens mounting boss on the front of a single lens reflex camra, and the other end of which is adapted to be received within the lens receptacle of a projector, and a lens assembly in the connector intermediate the two ends for focusing an image from the projector onto the film plane of the camera.

Other objects and features of the present invention will be apparent to those skilled in the art from the following detailed description taken in combination with the attached drawing in which:

DETAILED DESCRIPTION OF THE PREFERRED EMBODIMENTS

Figure 1:
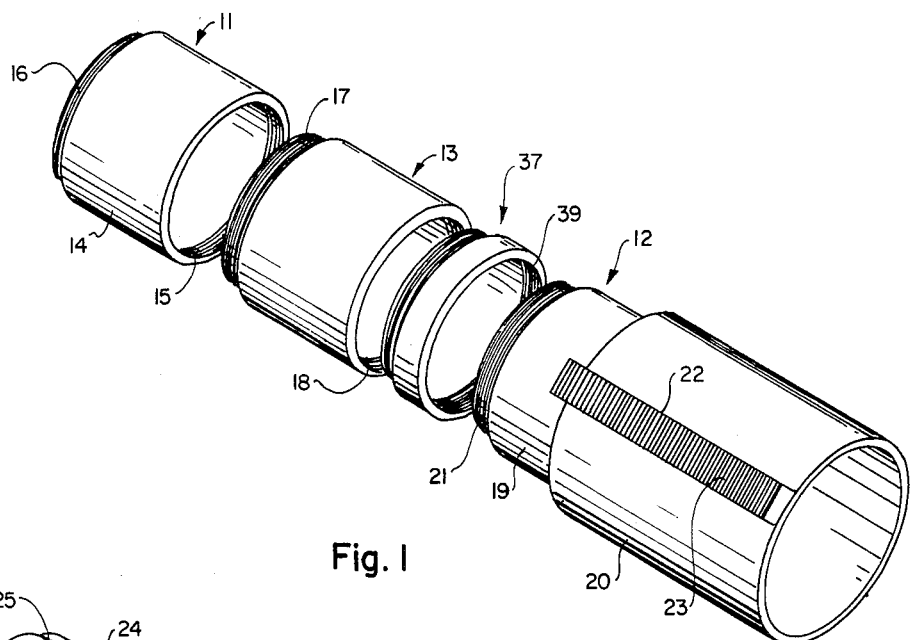
FIG. 1 is an elevation view of a first embodiment of an attachment according to the present invention.

Referring to FIG. 1 of the drawing, the attachment of the present invention is illustrated as including two tubular members 11 and 12 adapted to be connected to a macro lens assembly 13 of a 35 mm camera. The lens assembly includes a 100 mm macro lens or a 50 mm macro lens plus a 2X converter. The member 11 is a conventional lens tube and includes a hollow tubular body 14 with a female mounting boss 15 at one end. The opposite end is provided with a male mounting boss 16. The member 11 is adapted to be connected between the macro lens assembly and the lens mounting boss of a single lens reflex 35 mm camera. The lens assembly in a conventional single lens reflex 35 mm camera is so positioned relative to the camera film plane as to produce a 2:1 conversion of image size. By detaching the macro lens assembly 13 and inserting the lens tube 11 between the camera and the lens assembly, a 1:1 image size will be provided. The mounting boss 16 is received by the lens assembly opening in the mounting boss on the front of the camera. The lens assembly 13 is then connected to the opposite end of the lens tube 11. The mounting boss 17 on the inner end of the lens assembly 13 is engaged within the mounting boss 15. The lens assembly is provided with an opening at its outer end which is internally threaded as at 18 to receive filters, etc. A factor 8 neutral density filter 37 is fitted to the macro lens by means of external threads 38 received within internal threads 18.

The tubular member 12 is formed of two hollow tubes 19 and 20 interconnected to permit relative rotational movement between them. The free end of tube 19 is externally threaded as at 21 and is adapted to be connected to the factor 8 neutral density filter 37 by threads 21 engaged within internal threads 39 of the filter. Tube 20 is provded with an elongated spline 22 which extends axially of the tube and protrudes radially beyond the exterior surface of the tube. A plurality of generally parallel grooves 23 are formed in the surface of the elongated spline 22 and extend approximately normal to the axis of the tube. The tube 20 is dimensioned to be essentially the same exterior size and shape as the projector lens assembly of a conventional slide projector. The tube 20 is adapted to be received within the lens assembly receptacle of a projector with the spline 22 riding in a matching groove or keyway in the wall of the receptacle and with the grooves 23 meshed with the toothed wheel or gear which is used to adjust the position of the lens assembly within the receptacle.

Figure 2:
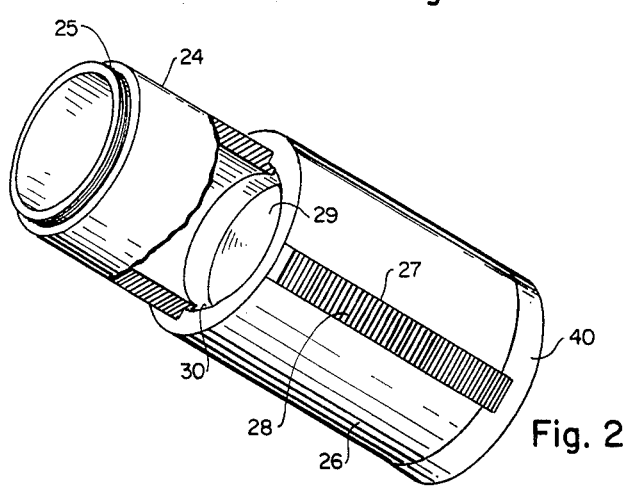
FIG. 2 is an elevation view, partly in section, of a second embodiment of an attachment according to the present invention.

In the embodiment of FIG. 2 the lens tube, lens assembly, factor 8 neutral density filter and tubular member of FIG. 1 are combined into a unitary structure. The attachment of FIG. 2 includes a tubular section 24 which has a mounting boss at one end as at 25 and is adapted to be received by the lens mounting boss at the opening of a camera. The opposite end of section 24 is joined to a tubular member 26 so as to permit relative rotational movement therebetween. Tubular member 26 is similar to tube 20 of FIG. 1 and is provided with an elongated spline 27 and a series of grooves 28. A 50 mm macro lens 29 is mounted within the tubular section 24 adjacent to the interconnection with tubular member 26. A factor 8 neutral density filter 40 is mounted on the end of the tubular section 26. The interior of section 24 is blocked with an annular support 30 which surrounds and secures the lens 29. In this embodiment the tubular section 24 serves as a lens tube to position the macro lens such that a 1:1 image size ratio is obtained. Tubular member 26 is adapted to be received within the lens assembly receptacle of a slide projector.

Figure 3:
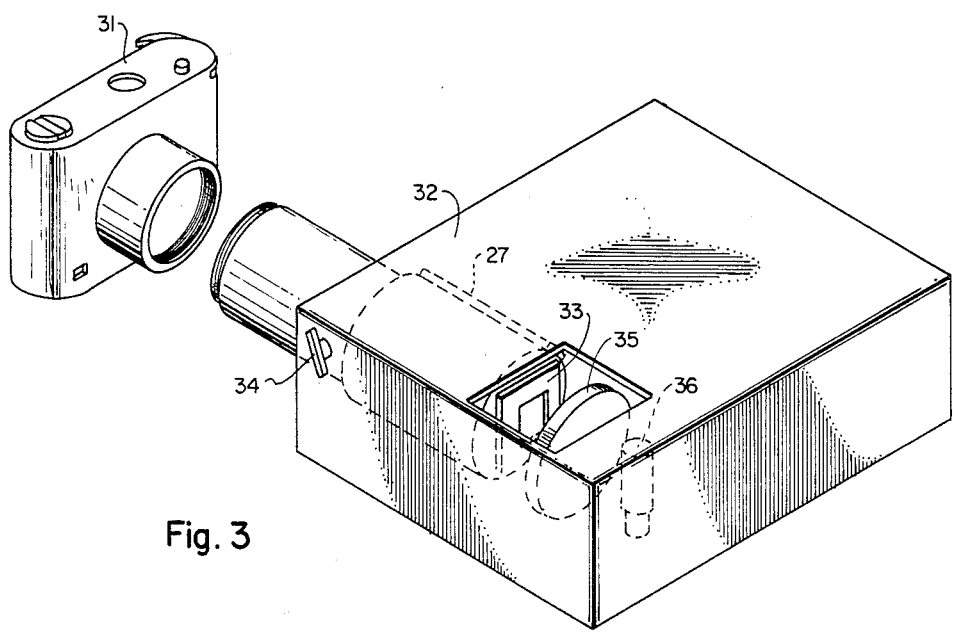
FIG. 3 is a plan view of the attachment of FIG. 2 connected between a camera and a slide projector.

FIG. 3 illustrates how the attachment of the present invention connects a single lens reflex 35 mm camera 31 to a slide projector 32 in position to photograph the individual slides at the slide station 33 within the projector. The lens assembly of the camera and the projector lens assembly are both removed, then the lens mounting boss 25 of section 24 is engaged within the mounting boss of the lens assembly opening in the front of the camera. The tubular member 26 is positioned within the lens assembly receptacle of the projector with the grooves 28 in engagement with a gear in the interior of the projector which is rotated by the knob 34 protruding from the projector. Tubular member 26 thus supports the camera in position adjacent the projector. The interconnection between section 24 and tubular member 26 allows the camera to be rotated relative to the projector to align the film with the slides.

A light-diffusing screen 35 made of translucent, but non-transparent, glass or plastic is positioned between the slide station 33 and the projector light source 36.

With the camera in the position shown and with a color transparency in the slide station 33, the camera can be focused by looking through the eyepiece of the camera view finder. Rotation of the knob 34 will move tubular member 26 axially within the projector lens assembly receptacle and adjust the position of the macro lens 29 relative to the slide station to focus the image of the transparency onto the film plane of the camera. Since the light passing through the transparency is very bright, even though diffused, it is necessary to have the neutral density filter in the system and it may be desirable to place a filter over the eyepiece of the view finder in order to see the image clearly for focusing. With the neutral density filter the built in light meter of the camera will function in its effective range and focusing can be accomplished through the eye piece with the naked eye. In this regard the screen 35 diffuses the light to allow the image to be viewed for focusing and also prevents photographing of the light source through the transparency. It is desirable to use tungsten film, such as Ectachrome ASA 160, or a filter for accurate photographing of the image.

With the camera in position and properly focused the slides to be photographed should be aligned with the largest dimension of the transparency parallel to the direction of film movement within the camera. If a carousel type projector is being used, the carousel is mounted on the projector, the camera set on automatic and then shot in rapid succession after advancing each slide to the slide station in turn.

If an automatic focus slide projector is used, then it is only necessary to focus the first slide. Subsequent slides will be focused by the slide projector automatic focus mechanism.

If a standard slide projector is used (i.e., one that does not have the automatic focus feature) it may be necessary to check the focus of each slide and to make focusing adjustments as needed before each slide copy is made.

The present attachment has been described in connection with a 35 mm camera, but it is useable with any single lens reflex camera which has a removable lens assembly.

The attachment of FIG. 1 functions the same as that of FIG. 2 to position the camera on the projector. However, the image can be brought into proper focus by means of the focusing knob on the pojector and/or the focusing adjustment on the lens assembly.

I claim:

1. An attachment for connecting a single lens reflex camera to a slide projector to permit photocopying of a transparency at the slide station within the projector, said attachment including lens tube means adapted to be connected to the camera for producing a 1:1 image size ratio,
   a tubular member which is formed of two hollow tubes interconnected to permit relative rotational movement therebetween, said tubular member further being adapted to be received within the lens assembly receptacle of the projector,
   a macro lens connectable in series with the lens tube means and tubular member,
   a light diffusing screen adapted to be placed in the projector between the transparency and the light source of the projector
   a light filter connected in series with the lens tube means, tubular member and macro lens, and
   means associated with the tubular member which cooperates with the lens focusing mechanism of said projector for focusing the image of the transparency onto the film plane of the camera.

2. An attachment as set forth in claim 1 in which macro lens is connected between the lens tube means and the tubular member.

3. An attachment as set forth in claim 1 in which the tubular member is provided with an elongated radially protruding spline adapted to be received within a groove in the receptacle, and a series of grooves on said member adapted to mesh with the lens focusing gear on said projector.

* * * * *